No. 824,871. PATENTED JULY 3, 1906.
T. W. JERREMS.
GRASS FEEDING MECHANISM FOR TWINE MACHINES.
APPLICATION FILED SEPT. 21, 1905.

Witnesses.
E. W. Jeppesen.
A. H. Opsahl.

Inventor.
Thomas W. Jerrems.
By his Attorneys.
Williamson & Merchant

UNITED STATES PATENT OFFICE.

THOMAS W. JERREMS, OF ST. PAUL, MINNESOTA.

GRASS-FEEDING MECHANISM FOR TWINE-MACHINES.

No. 824,871.     Specification of Letters Patent.     Patented July 3, 1906.

Application filed September 21, 1905. Serial No. 279,488.

*To all whom it may concern:*

Be it known that I, THOMAS W. JERREMS, a citizen of the United States, residing at St. Paul, in the county of Ramsey and State of Minnesota, have invented certain new and useful Improvements in Grass-Feeding Mechanism for Twine-Machines; and I do hereby declare the following to be a full, clear, and exact description of the invention, such as will enable others skilled in the art to which it appertains to make and use the same.

My present invention relates to grass-feeding devices for twine-machines, and is in the nature of an improvement on the feeding devices disclosed and broadly claimed in my prior United States Letters Patent No. 745,625, issued of date December 1, 1903, and entitled "Machines for making grass-twine." In the said prior patent I employ opposing blades or bars having coöperating serrated edges, the opposing blades being given reverse reciprocations to produce the feeding action. In my present invention I combine with these serrated blades or bars a vibratory agitating arm or member which acts to stir and prevent clogging of the grass-blades at a point where they make their entrance between the serrations of the opposing blades.

The opposing serrated blades and the agitating device are shown in the accompanying drawings, wherein like characters indicate like parts throughout both views.

Figure 1:
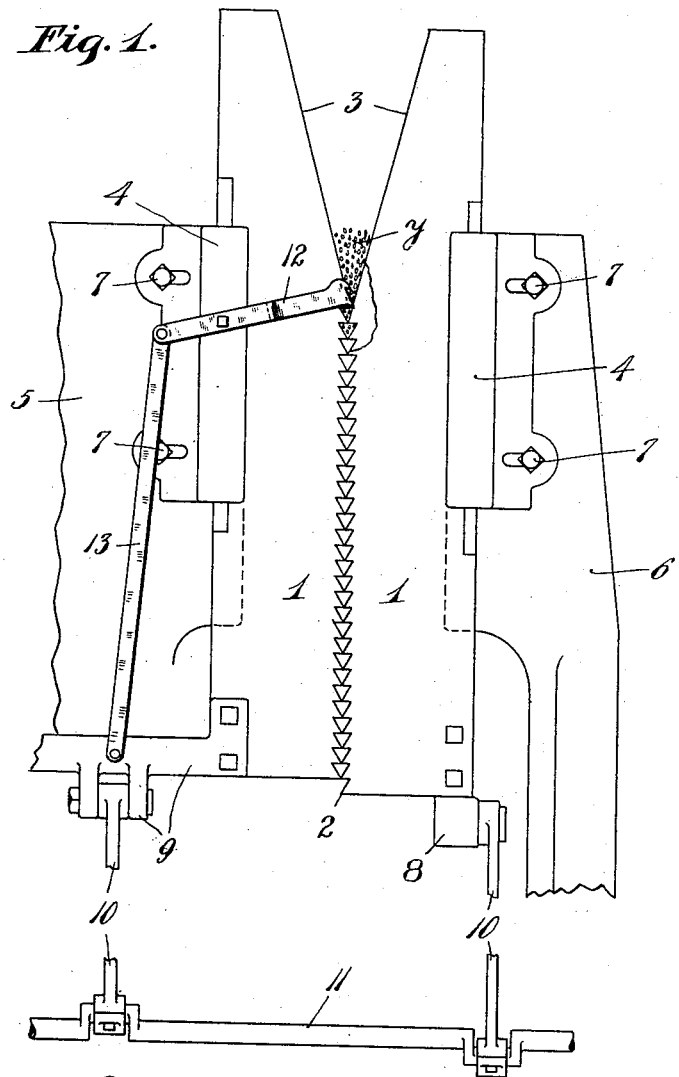
Figure 2:
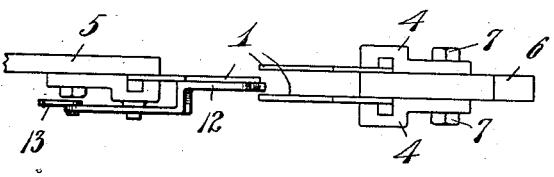

Referring to the drawings, Figure 1 is a view in front elevation, showing the serrated blades, agitating device, and associated parts; and Fig. 2 is a plan view of the parts shown in Fig. 1.

The character 1 indicates three vertically-disposed feed blades or bars having opposing serrated inner edges 2 and inclined upper edges 3, which latter form a V-shaped crotch adapted to receive the butt-ends of the grass-blades *y* and to deliver the same laterally between the opposing serrations of said blades. At one side two of the feed-blades 1 are located parallel to each other, but spaced apart laterally, while the one coöperating blade on the other side is so located that it works in a plane passing between the coöperating blades on the other side. The feed-blades 1 are guided for true vertical movements by guide-blocks 4, one of which, as shown, is rigidly secured to a pedestal 5 and the other of which is adjustably secured to a pedestal 6 by slot-and-screw connections 7. The slot-and-screw connections 7 permit the opposing feed-blades to be set so that their serrations overlap more or less to thereby vary the rate of feed of the grass. The two blades at the one side are connected at their lower ends to a common head 8 and the one blade on the other side connected to a head 9. The heads 8 and 9 are connected by links 10 to a crank-shaft 11, the cranks of which are set one hundred and eighty degrees apart, so that the opposing blades on the opposite sides will be simultaneously moved in a reverse direction, thereby causing the serrations of the blades to produce a positive downward feed movement of the grass-blades.

The agitating-arm is preferably in the form of a lever 12, pivoted at its intermediate portion to the adjacent guide-block 4, and is connected to the head 9 by a link 13. The free edge of this agitating-arm 12 is preferably provided with several shallow teeth that are so positioned that they act only on the grass-blades that lie directly against the inclined edge 3 of the blade 1, which is on the same side as said agitating-arm.

It will be noted that the construction and arrangement of parts are such that the toothed free end of the agitating-arm 12 will move downward while the single blade on the corresponding side is being moved upward and while the two blades on the opposite side are being moved downward. This agitating-arm therefore stirs up the grass-blades at the bottom of the gathering-crotch and prevents clogging of the grass-blades at this point and, furthermore, positively forces downward certain of the grass-blades, so that they will be positively caught by the teeth of the single blade. The grass-blades are thus positively started on their way downward between the serrations of the opposing blades and will be moved downward in a regular order of succession under the alternate reciprocations of the opposing blades.

This feed device may be used in connection with various kinds of machines, but is especially adapted for use in connection with machines for making grass-twine. The mechanism described has been constructed and put into actual use and has been found extremely efficient for the purposes had in view.

What I claim, and desire to secure by Letters Patent of the United States, is as follows:

1. In a feed device of the character described, the combination with opposing blades or bars having coöperating serrated edges, of means for vibrating one or more of the said blades to produce a feeding action, and a vibratory agitating-arm arranged to act upon the grass-blades in the vicinity of the point where said blades make their entrance between the said serrations of said blades or bars, substantially as described.

2. In a feed device of the character described, the combination with opposing blades or bars having coöperating serrated edges, of means for imparting reverse reciprocations to said opposing blades, and an agitating-arm pivoted at one side of the opposing serrated edges of said blades or bars, with its free end positioned for action on the grass at a point where the grass is entered between the serrations of said blades, and means for vibrating said arm synchronously with the movements of said blade, substantially as described.

3. The combination with opposing blades or bars 1 having serrated edges 2 and inclined crotch-forming edges 3, of an agitating-arm 12 pivoted at one side of the coöperating serrated edges 2, with its free end positioned for action on the grass-blades, at a point where they enter between said serrated edges, and means for vibrating said agitating-arm and for reciprocating the blade on the corresponding side, arranged to move the operating end of the former downward while said blade is being moved upward, and vice versa, substantially as described.

In testimony whereof I affix my signature in presence of two witnesses.

THOMAS W. JERREMS.

Witnesses:
 MALIE HOEL,
 F. D. MERCHANT.